United States Patent [19]

Uesugi

[11] Patent Number: 4,825,351
[45] Date of Patent: Apr. 25, 1989

[54] AC-DC CONVERTING APPARATUS HAVING POWER FACTOR IMPROVING CIRCUIT UTILIZING A PHOTOCOUPLER

[75] Inventor: Michika Uesugi, Tadehara Fuji, Japan

[73] Assignee: Kabushiki Kaisha Toshiba, Kawasaki, Japan

[21] Appl. No.: 124,869

[22] Filed: Nov. 24, 1987

[30] Foreign Application Priority Data

Nov. 26, 1986 [JP] Japan .................. 61-181606[U]

[51] Int. Cl.$^4$ ............................................. H02M 7/04
[52] U.S. Cl. ...................................... 363/79; 307/311; 323/222; 363/89
[58] Field of Search .................. 363/79, 80, 81, 89, 363/126; 323/222, 902; 307/311, 321

[56] References Cited

U.S. PATENT DOCUMENTS 4,079,272  3/1978  Howatt .......................... 307/311

FOREIGN PATENT DOCUMENTS

| 20169488 | 1/1986 | European Pat. Off. | |
| 11746 | 1/1977 | Japan | 307/311 |
| 559988 | 3/1975 | Switzerland | 307/311 |
| 2095928 | 10/1982 | United Kingdom | |
| 2111258 | 6/1983 | United Kingdom | |

OTHER PUBLICATIONS

Korn, "Photon Couplus," GE Application Note 200.62, Jan. 1973, Cover page and p. 18 only.
Thesis entitled "Power Factor Improvement of Single Phase Rectifying Circuit by a Chopper" presented at a joint convention in 1983 of the Hokuriku branch of four electric societies, Authors: Isao Takahashi, Wataru Ikeshita.

Primary Examiner—William H. Beha, Jr.
Attorney, Agent, or Firm—Oblon, Fisher, Spivak, McClelland & Maier

[57] ABSTRACT

An AC-DC converting apparatus includes a main circuit having a fully-wave rectifier for rectifying an alternating current from an AC power supply, a reactor connected to the rectifier, and a switching element for alternately causing the reactor to store and to release electrical energy. The converting apparatus further includes a current detection circuit for generating a current detection signal indicative of the current flowing into the apparatus, and a voltage waveform detecting circuit having a 4-diode bridge for rectifying the input current of the power supply, and a photocoupler for generating an input voltage waveform signal indicative of the rectified waveform of the input voltage. Positive reference waveform and negative reference waveform smaller in amplitude than the positive reference waveform are generated from the input voltage waveform signal. A current detection signal is compared to the positive and negative reference waveforms to close the switching element when the current detection signal falls under the negative reference waveform and to open the switching element when the current detection signal exceeds the positive reference signal. This construction may reduce the size of the apparatus and may avoid distortion of the detected waveform of the input voltage.

2 Claims, 3 Drawing Sheets

AC-DC CONVERTING APPARATUS HAVING POWER FACTOR IMPROVING CIRCUIT UTILIZING A PHOTOCOUPLER

BACKGROUND OF THE INVENTION

1. Field of the Invention

This invention relates, in general, to an AC-DC converting apparatus which is employed with an inverter apparatus, and is used as a DC power supply device. In particular, the invention relates to an AC-DC converting apparatus wherein an output current is controlled in accordance with an input voltage waveform to improve the power factor of the AC power source.

2. Description of the Prior Art

One example of an AC-DC converting apparatus used as a DC power supply is disclosed in a thesis entitled "Power Factor Improvement of Single Phase Rectifying Circuit by a Chopper" presented at an joint convention in 1983 of the Hokuriku branch of four Electric learned societies. This thesis discloses an AC-DC converting circuit wherein a sine waveform proportional to an input AC voltage is obtained through a transformer, and an output current is controlled in accordance with a pulse waveform obtained by rectifying the sine waveform to achieve a high power factor, as shown in FIG. 1. In FIG. 1, a sine wave of an AC power supply 21 is applied to terminals 23a and 23b of a four-diode bridge 23, and the output of bridge 23 is applied to a DC reactor 25 through a harmonic filter 27 composed of a coil 27a and a capacitor 27b. The current Id from bridge 23 is controlled by an NPN transistor 29. When transistor 29 is energized, current Id flows through reactor 25 and transistor 29, thereby storing energy into reactor 25. When transistor 29 is de-energized, reactor 25 releases the energy, and generates a relatively high voltage Vo which is applied to a load L through a diode 31. If current Id is controlled in accordance with a reference value having a fully-rectified waveform of the input voltage Vi of power supply 21, the input current I becomes a sine wave, and the power factor thereof approaches 1.

To accomplish the above-described operation, the above-described main circuit is provided with a waveform detection circuit 35, a constant voltage control circuit 37 and a swiching control circuit 39. Waveform detection circuit 35 includes a transformer 41 for detecting the waveform of input voltage Vi. A primary winding of transformer 41 is connected to power supply 21. A secondary winding of transformer 41 is connected to a full-wave rectifier 43, and a center point thereof is grounded. A full-wave rectified signal Vd obtained by a grounded resistor 45 is fed to a multiplier 47 of constant voltage control circuit 37. A voltage deviation signal Ve is generated by a subtractor 49 in accordance with an output voltage Vo obtained between opposite ends of a resistor 51 connected in parallel with capacitor 33, and a prescribed output voltage reference Vr. The above-described rectified signal Vd is multiplied by deviation signal Ve fed through a gain regulator 53 in multiplier 47, thereby generating an output current reference Ir. The current Ir has a pulse waveform directly proportional to the rectified waveform of input voltage Vi. A subtractor 55 of switching control circuit 39 generates a deviation signal between the output current reference Ir and an output current Id detected by a current detector 57. The detector 57 is connected between capacitor 27b of harmonic filter 27 and the emitter of transistor 29. Transistor 29 is switched on and off by a comparator 59 having hysteresis in accordance with the deviation signal. Thus, the output voltage Vo is controlled at a prescribed voltage value, and the phase of the waveform of the output current Id is matched to the phase of the pulse waveform, directly proportional to the rectified waveform of input voltage Vi. As a result, the power factor of the apparatus may be maintained at approximately 1.

However, in the AC-DC converting apparatus shown in FIG. 1, since transformer 41 is used for detecting the waveform of the input voltage Vi, a space for arranging the transformer is needed in the apparatus. Furthermore, since the transformer may also be used for supplying a voltage to another circuit, the detected waveform of the input voltage Vi often may be distorted.

Another example of an AC-DC converting apparatus is disclosed in U.S. Pat. No. 4,437,146 issued to Ralph F. Carpenter. In this device, the waveform of the input voltage may be detected without using a transformer. However, since a plurality of resistors are used for detecting the waveform of the input voltage, it is not easy to determine a constant value of the detecting circuit in order to avoid distortion of the detected waveform. Furthermore, the power factor correction circuit, including the detecting circuit, is not isolated from the power supply in the Carpenter apparatus.

SUMMARY OF THE INVENTION

Accordingly, it is an object of the present invention to detect the waveform of an input voltage applied to an AC-DC converting apparatus without using a transformer.

It is another object of the present invention to reduce distortion of a detected waveform of an input voltage applied to an AC-DC converting apparatus.

It is still another object of the present invention to provide a compact power factor improving circuit for an AC-DC converting apparatus.

It is still another object of the present invention to control the output voltage of an AC-DC converting apparatus to a prescribed level.

To accomplish the above-described objects, an AC-DC converting apparatus includes a rectifying device for rectifying an alternating current from an AC power supply, a reactor connected to the rectifying device, a switching element for alternately causing the reactor to store electrical energy and to release the electrical energy, a current detecting circuit for generating a current detection signal representative of the current flowing into the apparatus, and a voltage waveform detecting circuit having a four-diode bridge rectifying the alternating current from the power supply and a photocoupler for generating an input voltage waveform detection signal indicative of the rectified waveform of the power supply. The AC-DC converting apparatus further includes a reference waveform generating circuit for generating a first reference waveform and a second reference waveform smaller than the first reference waveform in accordance with the input voltage waveform detection signal. The AC-DC converting apparatus also includes a switching control circuit for closing the switching element when the current detection signal falls below the second reference waveform, and for opening the switching element when the current detection signal exceeds the first reference signal. The switching control circuit may include a comparator for respectively comparing the current detection signal with the first and second reference waveforms and for generating a comparison signal, and a flip-flop circuit for outputting a switching signal to the switching element in response to the comparison signal. The photocoupler of the voltage waveform detecting circuit may include a first photocoupler component having a first light-emitting diode and a first photo-transistor, and a second photocoupler component having a second light-emitting diode connected in series with the first photo-transistor, and a second photo-transistor connected in parallel with the first light-emitting diode.

BRIEF DESCRIPTION OF THE DRAWINGS

The present invention is best understood with reference to accompanying drawings in which.

DETAILED DESCRIPTION OF THE REFERRED EMBODIMENTS

Figure 1:
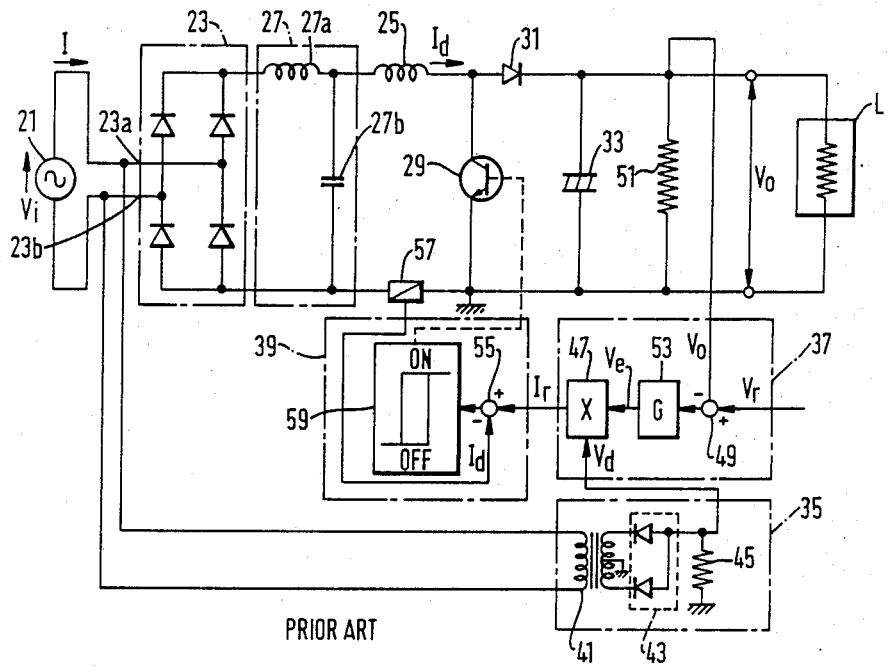
FIG. 1 is a circuit diagram of one prior art AC-DC converting apparatus.
Figure 5:
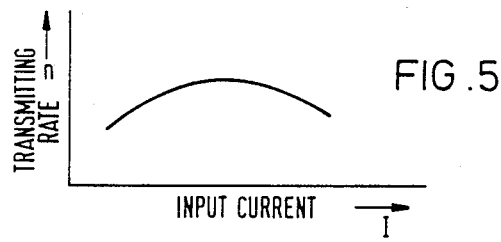
FIG. 5 is a graph illustrating the relationship between the input current and the transmitting rate of a photocoupler.

Referring to the accompanying drawings, one embodiment of the present invention will be described. However, in the drawings, the same numerals are applied to similar elements, and the detailed descriptions thereof are not repeated.

Figure 2:
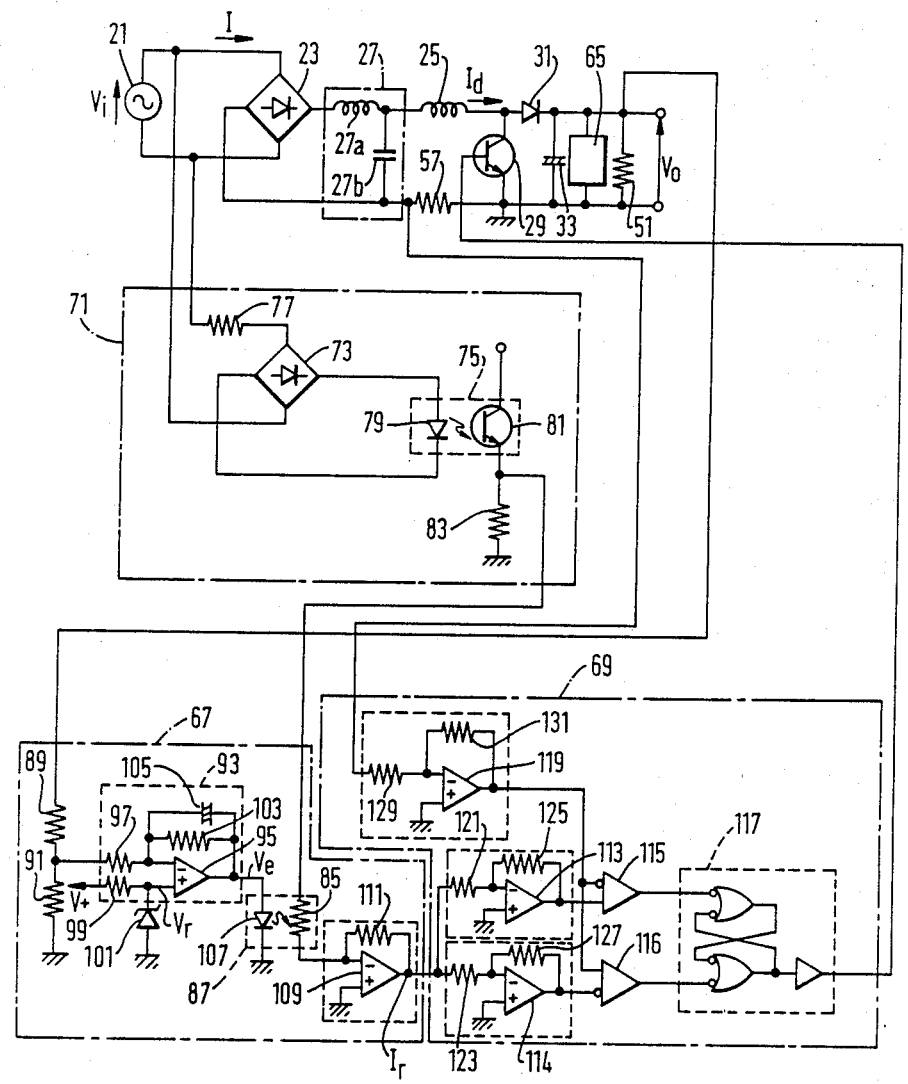
FIG. 2 is a circuit diagram of one embodiment of the present invention.

FIG. 2 shows a circuit diagram of one embodiment. A switching regulator 65 is connected in parallel with capacitor 33. Switching regulator 65 generates DC voltages $+V$ and $-V$, each of which is applied to each element (operational amplifier) in a constant voltage control circuit 67 and a switching control circuit 69 described later.

As shown in FIG. 2, a power factor improving circuit includes a waveform detection circuit 71 and switching control circuit 69. Waveform detection circuit 71 includes a four-diode bridge 73 and a photocoupler 75 to detect the waveform of the input voltage Vi of power supply 21. The input terminal of bridge 73 is connected to power supply 21 through a current restricting resistor 77. The output terminal of bridge 73 is connected to a light-emitting diode 79 of photocoupler 75. A collector of a photo-transistor 81 of photocoupler 75 is connected to a DC voltage supply (not shown), and an emitter thereof is grounded through a resistor 83. A current directly proportional to the rectified full waveform of the input voltage Vi flows through light-emitting diode 79, and is transmitted to photo-transistor 81 at a prescribed transmitting rate via light generated by light-emitting diode 79 in response to the current. The transmitted current flows through photo-transistor 81 and resistor 83. Therefore, the change of the transmitted current is detected, as a voltage signal, at the connecting point between resistor 83 and photo-transistor 81. The voltage signal responding to the rectified full waveform of the input voltage Vi is applied to a cadmium sulfide cell 85 (hereinafter referred to Cds) of a photo-CdS coupler 87 (described later) in constant voltage control circuit 67.

Constant voltage control circuit 67 now will be described. One end of a resistor 89 is connected to resistor 51, and the other end thereof is grounded through a resistor 91 to divide the output voltage Vo fed from resistor 51. The divided voltage is input to a comparing amplifier 93. In particular, the connecting point between resistors 89 and 91 is connected to the inverting input terminal of an operational amplifier 95 through a resistor 97. The non-inverting input terminal of amplifier 95 is grounded through a zenor diode 101. The DC voltage $+V$ is applied to the non-inverting input terminal of amplifier 95 through a resistor 99. Current flows through resistor 97 and zenor diode 101 to produce an output voltage reference signal Vr, which is applied to the non-inverting input terminal of amplifier 95. A parallel circuit of resistor 103 and capacitor 105 is connected between the output terminal and the inverting input terminal of amplifier 95. Thus, comparing amplifier 93 outputs a deviation signal Ve representing the deviation level between the output voltage Vo and the output voltage reference signal Vr to a light-emitting diode 107 of photo-CdS coupler 87. Diode 107 emits light corresponding to the deviation signal Ve, and the light is transmitted to CdS 85, to which the voltage signal corresponding to the rectified full waveform of the input voltage Vi has been applied, as described before. Therefore, photo-CdS coupler 87 generates an output signal wherein a voltage signal corresponding to the deviation signal Ve is added to the voltage signal corresponding to the rectified full waveform of the input voltage Vi by CdS 85. The output signal of photo-CdS coupler 87 is fed to the inverting input terminal of an amplifier 109. The non-inverting input of amplifier 109 is grounded. A resistor 111 is connected between the output terminal and the inverting input terminal of amplifier 109. Thus, the amplifier 109 outputs an output current reference signal Ir, the waveform of which corresponds to the rectified full waveform of the input voltage Vi. The output current reference signal Ir is fed to switching control circuit 69.

Figure 3:
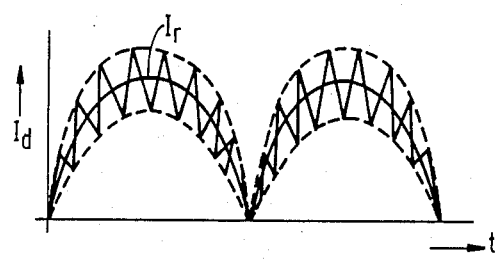
FIG. 3 is an enlarged waveform illustrating an output current controlled by the circuit shown in FIG. 2.

As shown in FIG. 2, switching control circuit 69 includes a pair of amplifiers 113 and 114, a pair of comparators 115 and 116, a flip-flop circuit 117 and an amplifier 119. The output current reference signal Ir from amplifier 109 is supplied to the inverting input terminal of first amplifier 113 of the amplifier pair through a resistor 121, and also is supplied to the inverting input terminal of second amplifier 114 of the amplifier pair through a resistor 123. Each non-inverting input terminal of first and second amplifiers 113 and 114 is grounded. The value of resistor 121 is the same as that of resistor 123. A resistor 125 is connected between the output terminal and the inverting input terminal of first amplifier 113. The value of resistor 125 is the same as that of resistors 121 and 123. A resistor 127 is connected between the output terminal and the inverting input terminal of second amplifier 114. The value of resistor 127 is greater than that of resistor 125. Therefore, the amplification factor of amplifier 113 is different from that of amplifier 114. First amplifier 113 outputs a first offset signal having a positive reference waveform against the output current reference signal Ir. Second amplifier 114 outputs a second offset signal having a negative reference waveform against the output current reference signal Ir. The first and second offset signals are both in phase with the input voltage Vi, but slightly differ in amplitude from each other. The first offset signal from first amplifier 113 is input to the positive input terminal of first comparator 115 of the comparator pair. The second offset signal from second amplifier 114 is input to the negative input terminal of second comparator 116 of the comparator pair. A current detection signal being proportional to the input current I fed from current detector 57 is respectively applied to the negative input terminal of first comparator 115 and the positive input terminal of second comparator 116 through amplifier 119. The inverting input terminal of amplifier 119 is connected to the connecting point of current detector 59 and capacitor 27b of harmonic filter 27 through a resistor 129. The non-inverting input terminal of amplifier 119 is grounded. A resistor 131 is connected between the inverting input terminal and the output terminal of amplifier 119. Thus, the outputs from comparators 115 and 116 control the switching operation of transistor 29 through flip-flop circuit 117. When the output current Id exceeds the level of the first offset signal from amplifier 113, comparator 115 outputs a low level signal, and the output signal of comparator 116 remains a high level. Therefore, flip-flop circuit 117 outputs a low level signal, and de-energizes transistor 29, thereby causing the output current Id to decrease as reactor 25 stores energy. The output signal of comparator 115 returns to the high level when the output current Id falls below the level of the first offset signal. When the output current Id falls below the level of the second offset signal fed from second amplifier 114, comparator 116 outputs a low level signal, and the output signal of comparator 115 remains the high level. Thus, flip-flop circuit 117 outputs a high level signal, and energizes transistor 29, thereby causing the output current Id to increase as reactor 25 releases the energy. The output current Id thus oscillates between the first offset signal having the positive reference waveform and the second offset signal having the negative reference waveform, as shown in FIG. 3. As a result, the waveform of the input current I becomes a sine wave directly proportional to the input voltage Vi.

With this embodiment, since a transformer is not used for detecting the waveform of the input voltage, distortion of the detected waveform caused by the use of the transformer as a power supply for another circuit is avoided.

A second embodiment of the present invention will be described with reference to FIG. 4. In this embodiment, two photocouplers, each of which has similar characteristics, are used for improving distortion of the detected waveform caused by the non-linear transmitting characteristics of the photocoupler.

Figure 4:
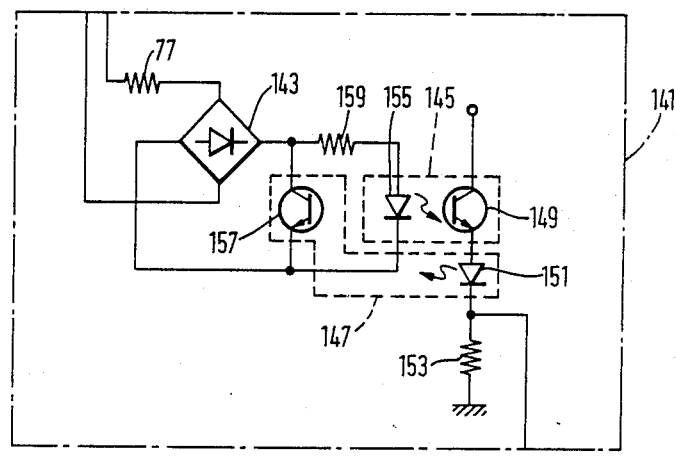
FIG. 4 is a circuit diagram illustrating another embodiment of the present invention.

As shown in FIG. 4, a waveform detection circuit 141 includes a four-diode bridge 143, a first photocoupler 145 and a second photocoupler 147. A photo-transistor 149 of first photocoupler 145 is grounded through a light-emitting diode 151 and a resistor 153. A light-emitting diode 155 is connected between the emitter and the collector of a photo-transistor 157 of second photocoupler 147 through a resistor 159. Resistor 159 prevents the oscillation of the circuit. The output of bridge 143 is connected between the emitter and the collector of photo-transistor 157 of second photocoupler 147.

In the above-described waveform detection circuit, current corresponding to the waveform of the input voltage Vi flows through resistor 159 and light-emitting diode 155 of first photocoupler 145. Current flowing through light-emitting diode 155 is transmitted to photo-transistor 149 at a predetermined transmitting rate N. When the transmitted current flows through light-emitting diode 151, the transmitted current is further transmitted from light-emitting diode 151 to photo-transistor 157 at the predetermined transmitting rate N, and thus the current flowing through light-emitting diode 155 is controlled.

Figure 6:
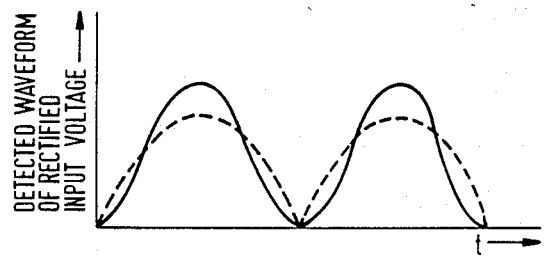
FIG. 6 is a waveform diagram illustrating a comparison of the detected input voltage waveform between one embodiment and another embodiment.

With this operation, when current flowing through photo-transistor 149 of first photocoupler 145, light-emitting diode 151 of second photocoupler 147 and resistor 153 increases, the current flowing through photo-transistor 157 of second photocoupler also increases, and thereby causing the current flowing through light-emitting diode 155 of first photocoupler 145 to decrease. In the same manner, when current flowing through photo-transistor 149 and light-emitting diode 151 decreases, the current flowing through photo-transistor 157 also decreases, and thereby causing the current flowing through light-emitting diode 155 to increase. This feedback operation is continuously performed. As stated before, since the characteristics of photocouplers 145 and 147 are similar, the detected waveform obtained from the connecting point between light-emitting diode 151 and resistor 153 may be improved from the solid-curved line to the dotted-curved line shown in FIG. 6. The dotted-curved line in FIG. 6 is more similar to the waveform of the input voltage Vi then the solid-curved line.

The present invention has been described with respect to specific embodiments. However, other embodiments based on the principles of the present invention should be obvious to those of ordinary skill in the art. Such embodiments are intended to be covered by the claims.

What is claimed is:

1. An AC-DC converting apparatus wherein AC voltage from a power supply is converted to a DC voltage, comprising:
   means for rectifying an alternating current from the power supply;
   energy storing means connected to the rectifying means for alternately storing and releasing electrical energy;
   switching means for alternately causing the energy storing means to store and to release the electrical energy;
   current detecting means for generating a current detection signal representative of the current flowing into the apparatus;
   voltage waveform detecting means including a four-diode bridge providing a rectified waveform of the power supply and a photocoupler, said photocoupler having a first light-emitting diode and a first photo-transistor, for generating an input voltage waveform detection signal indicative of the rectified waveform of the power supply and including a second photocoupler having a second light-emitting diode connected in series with the first phototransistor, and a second photo-transistor connected in parallel with the first light-emitting diode;
   reference waveform generating means for generating first and second reference waveforms in response to the input voltage waveform detection signal, the first reference waveform being greater than the second reference waveform; and switching control means for closing the switching means when the current detection signal falls to the second reference waveform, and for opening the switching means when the current detection signal rises to the first reference waveform.

2. A high power factor, AC-DC converting apparatus comprising:

means for rectifying an alternating current from AC power supply;

a reactor connected to the rectifying means;

switching means for alternately causing the reactor to store and to release electrical energy;

voltage detecting means for generating a deviation signal representing the difference between the output voltage of the apparatus and a predetermined reference voltage;

current detecting means for generating a current detection signal representative of the current flowing into the apparatus;

voltage waveform detecting means including a four-diode bridge providing a rectified waveform of the power supply, and a photocoupler, said photocoupler having a first light-emitting diode and a first photo-transistor, for generating an input voltage waveform detection signal indicative of the rectified waveform of the power supply and including a second photocoupler having a second light-emitting diode connected in series with the first photo-transistor, and a second photo-transistor connected in parallel with the first light-emitting diode;

multiplying means responsive to the deviation signal and the input voltage waveform detection signal for generating a current reference signal proportional to the product of the deviation signal and the input voltage waveform detection signal;

amplifying means having a first amplification factor and a second amplification factor different from the first amplification factor for respectively amplifying the current reference signal at first and second amplification factors, and thereby providing a first reference waveform and a second reference waveform smaller in amplitude than the first reference waveform; and switching control means for closing the switching means when the current detection signal falls to the second reference waveform, and for opening the switching means when the current detection signal rises to the first reference waveform.

* * * * *